United States Patent [19]

Cook

[11] 4,435,125
[45] Mar. 6, 1984

[54] WIND TURBINE SPINDLE ASSEMBLY WITH SPINDLE CONSTRAINT

[75] Inventor: Gregory E. Cook, Warrenville, Ill.

[73] Assignee: Windpowered Machines Ltd., Livingston, Mont.

[21] Appl. No.: 265,617

[22] Filed: May 20, 1981

[51] Int. Cl.³ .................................... F03D 11/04
[52] U.S. Cl. ........................ 416/132 B; 416/142; 416/196 A
[58] Field of Search .......... 416/132 B, 142 B, 189 A, 416/196 A, 240 A, DIG. 4, DIG. 6

[56] References Cited

U.S. PATENT DOCUMENTS

| | | | |
|---|---|---|---|
| 677,747 | 7/1901 | Sterzing | 416/196 A X |
| 789,497 | 5/1905 | Johnson | 416/196 A X |
| 980,172 | 12/1910 | Brett | 416/196 A X |
| 1,417,000 | 5/1922 | Vogt et al. | 416/132 B |
| 1,713,866 | 5/1929 | D'Asseler | 416/196 A |
| 3,835,804 | 9/1974 | Jackson | 416/240 A X |
| 4,116,152 | 9/1978 | Larsson | 416/240 A X |

FOREIGN PATENT DOCUMENTS

| | | | |
|---|---|---|---|
| 211360 | 2/1956 | Australia | 416/DIG. 4 |
| 371459 | 3/1923 | Fed. Rep. of Germany | 416/189 A |
| 2642570 | 3/1978 | Fed. Rep. of Germany | 416/240 A |
| 1036341 | 9/1953 | France | 416/DIG. 4 |

Primary Examiner—Everette A. Powell, Jr.
Attorney, Agent, or Firm—Jacques M. Dulin

[57] ABSTRACT

A spindle assembly for a soft airfoil wind turbine wheel having an elongate support cable connected in tension between the rim and hub of the wheel, an elongate, rotatable spindle mounted adjacent the elongate support member and a constraint mechanism for constraining the spindle against excessive bowing in response to wind pressure. The constraint mechanism includes a plurality of clamps mounted to the elongate support member which loosely surround the spindle and any airfoil furled therearound except for a slot for passage of the airfoil. Rollers are located adjacent the slots to guide the airfoil therethrough and are mounted to rotate about members interconnecting the clamps so that the wind pressure exerted by the soft airfoil is distributed along the length of the support members. Bracing cables connected to the elongate support member further distribute the wind pressure forces to the wheel structure and ground. In one embodiment, one end of the spindle and the constraint clamps are mounted for pivotal movement about the elongate support member. In another embodiment, an elongate boom is connected to a portion of a constraint clamp and pivots therewith about the support member. In one form, the slot in the constraint clamp may be widened to remove the clamp from around the spindle. When the spindle is fixedly rather than pivotally mounted, other embodiments provide for fixed mounting of the clamps to the support member, rotary movement of the clamps and attached boom about an axis passing through the clamps and eccentric movement of the clamps and attached boom relative to the spindle axis. The variation in apparent wind direction relative to the airfoil caused by wheel rotation is accommodated by differential pivoting of the constraint members, so that more pivoting of constraint members located further from the hub occurs than those closer to the hub.

38 Claims, 19 Drawing Figures

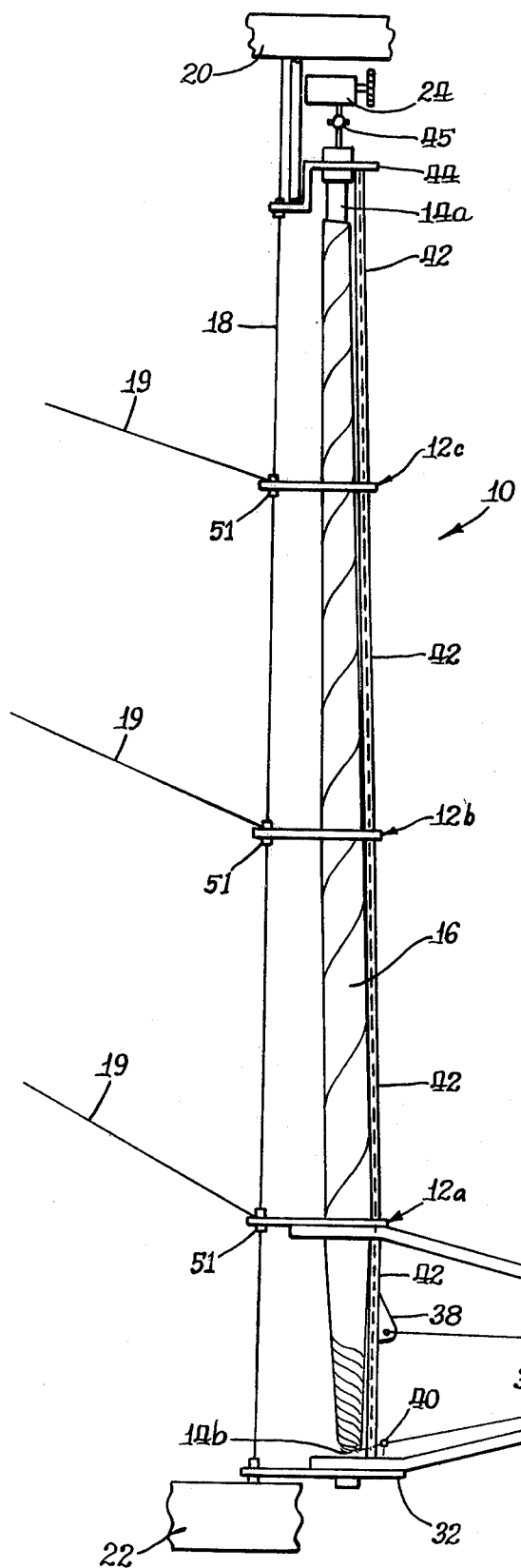
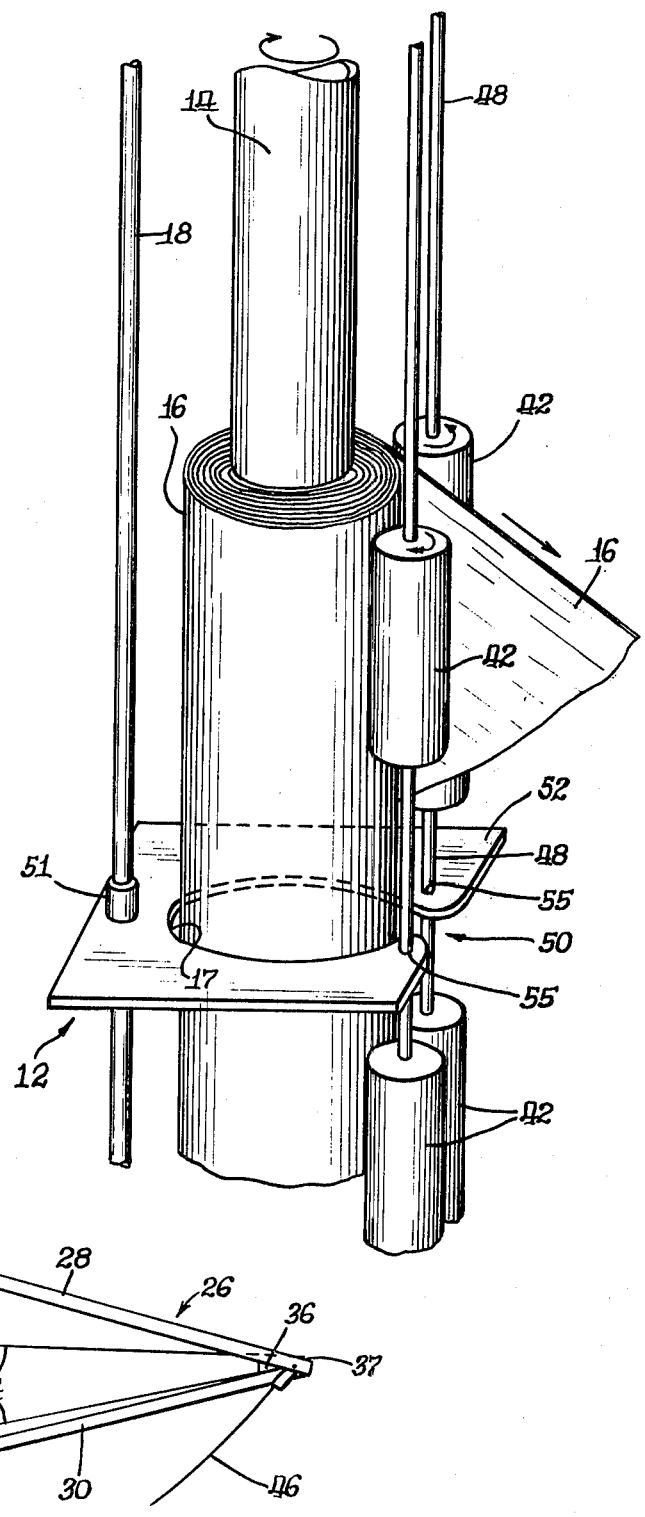

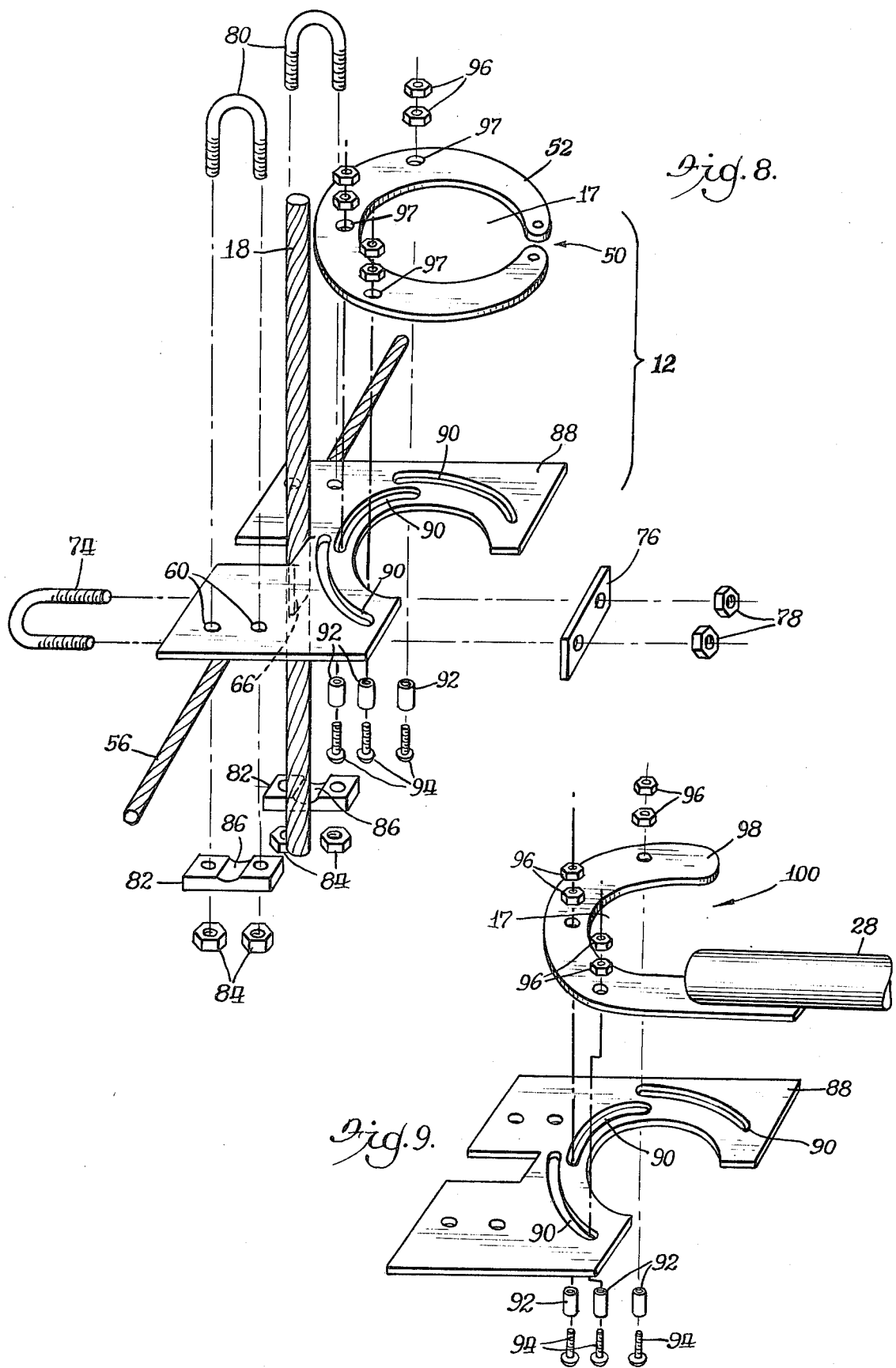

WIND TURBINE SPINDLE ASSEMBLY WITH SPINDLE CONSTRAINT

CROSS REFERENCE TO RELATED APPLICATION

This application is related to my copending application Ser. No. 234,963 filed Feb. 17, 1981, entitled "Wind Turbine Soft Airfoil Control System and Method" and my copending application Ser. No. 125,934 filed Mar. 3, 1980 and entitled "Wind Turbine and Method of Power Generation, now U.S. Pat. No. 4,350,895 issued Sept. 21, 1982," both of which applications are hereby incorporated by reference.

FIELD OF THE INVENTION

This invention generally relates to soft airfoil wind turbines and, particularly, to spindle assemblies therefor.

BACKGROUND OF THE INVENTION

In my aforementioned patent applications, I described a soft airfoil wind turbine comprising a large wheel carrying a plurality of soft airfoils disposed between the wheel rim and hub to capture the wind. The wheel is suspended by cables from its rim, which rim rides on rollers of a carriage assembly. The carriage assembly, in turn, is movable around a circular track, so that the wheel's orientation relative to the wind may be changed.

The wheel has a plurality of uniformly spaced, radial, rotary spindles, about which are furled the soft airfoils. Structural support for the spindle assembly is provided in substantial part by a plurality of angularly spaced diametral brace cables, or elongate support members, extending between the wheel hub and rim. Associated with each elongate support member is a boom member and an elongate rotary spindle. The boom member has one free end for supporting a portion of the soft airfoil spaced from the spindle and has its other end pivotally mounted to the associated elongate support member. The angle of the airfoil relative to the plane of the wheel is altered by pivoting the boom member. The associated spindle is located alongside the elongate support member. In one form, the spindle is fixedly mounted at its opposite ends to the hub and rim. In another form, the end of the spindle adjacent the wheel rim is mounted for pivotal movement about the elongate support member.

While this supporting structure for the spindle is very satisfactory in many applications, in a very large wind turbine application in which the elongate spindle reaches a length of 150 or more feet, for instance, the lateral loading of the spindle by wind pressure against the airfoil carried thereby tends to cause the spindle to be flexed, or bow out, along its length. This results in a loss of power. Further, if the deflection is too great, the spindle may break or the smooth furling and unfurling by rotation of the spindle is interfered with.

In sailboats, this problem is not so severe because the spindle lengths are not so great as in a large wind turbine. Consequently, the problem of bowing has been addressed by placing the spindle, usually a cable or rod, under high tensile loading. This generally requires that the spindle be supported by a compressive member, such as a mast. Further, this tensile loading makes rotation of the spindle more difficult and increases mechanical wear.

Another approach used in both sailboats and wind turbines has been to make the airfoil carrying member more massive, and thus inherently more capable of resisting the lateral deflection forces. Such an approach, however, undesirably adds weight and cost to the structure. Examples of the use of massive structures such as this in wind turbine applications are shown in U.S. Pat. Nos. 704,506 issued July 15, 1902 to Bruneau and 242,211 of McIlvaine. In German Pat. No. 2,642,570 issued to Schnitzer in March, 1978, excessive length of the spindle is avoided by making it a chordal rather than a radial member.

Sailboat structures are also shown in which a rotatable, sail carrying spindle is mounted within a hollow mast or mast sleeve having an elongate slot for passage of the sail. Again, these masts are relatively massive, compressive support members. Accordingly, they are impractical for use in a large wind turbine application. Examples of these hollow masts, or sleeve structures, are shown in U.S. Pat. Nos. 4,149,482 issued to Hoyt on Apr. 17, 1979; 4,061,101 issued to Cook, the present inventor, on Dec. 6, 1977; 3,835,804 issued to Jackson on Sept. 17, 1974; 4,116,152 issued to Larsson on Sept. 26, 1978; and 4,030,436 issued to Hood et al. on June 21, 1977.

In such sailboat structures, one end of the boom is generally mounted beneath the sail to the mast for pivotal movement about an axis coincident with that of the spindle assembly. This is done so that the distance between the sail clew supported at the free end of the boom and the spindle assembly remains substantially constant as the boom is rotated to avoid stretching of the sail. In fact the sail pivots about an axis along the periphery of the furled portion of the sail or along the line of emergence of the sail from the hollow mast which are spaced from the spindle axis. In addition, as the boom pivots in the rotational direction that the sail is furled about the spindle, the unfurled portion of the sail wraps around the furled portion of the sail and spindle and is shortened. When rotated in the opposite direction, the unfurled portion is lengthened.

The known technique of avoiding straining or luffing of the sail under the circumstances has been to move the location of the clew along the boom relative to the spindle as the boom rotates. Typically, this has been done by manually adjusting the outhaul line before or during the pivoting of the boom. Alternately, in my aforementioned U.S. Pat. No. 4,061,101, I provide a furling system in which the outhaul line and thus the relative location of the clew along the boom are automatically adjusted when the boom rotates.

In a wind turbine application which requires rapid simultaneous adjustment of the angle to the wind of a plurality of airfoils in a spinning wheel, avoidance of the problem of stretching the sail is more critical. Since the massive supporting structures of sailboats are to be avoided in a wind turbine application, the solution to this problem is more difficult and other approaches are required. In my earliest aforementioned patent application, the problem of supporting the clew for pivotal movement about the spindle axis in a wind turbine application is achieved through use of an arcuate track to which the clew is movably mounted instead of a boom.

In my later aforementioned application, this problem is solved in part by mounting the end of the spindle which is adjacent the rim for pivotal movement about the support member to which a boom member assembly is also pivotally mounted. Since a deck is not available to secure the free end of the boom against movement parallel to the spindle, this boom member assembly has a pair of boom members connected at their free ends to form a "V" and mounted at their other ends for pivotal movement about the support member. While one of these boom members is located adjacent one end of the spindle assembly, the other boom member must be mounted intermediate the ends of the spindle assembly.

While these prior structures of mine function satisfactorily in large wind turbine applications I have found that means for providing lateral support or constraint for the elongate spindle must also be incorporated into the spindle assembly design. In addition to providing the needed lateral support, such constraint means must not interfere with the smooth furling and unfurling of the airfoil or the rapid pivotal movements of the boom and unfurled airfoil carried thereby.

OBJECTS AND SUMMARY OF THE INVENTION

The Invention

It is therefore an object of the present invention to provide a spindle assembly for carrying a soft airfoil in a wind turbine wheel which constrains the spindle from excess lateral deflection, or bowing, but which is lightweight and does not depend on compressive load carrying, mast-like members.

In an embodiment described below, the objective is achieved by providing a spindle assembly comprising an elongate support member mounted in tension between the hub and the rim of a turbine wheel, an elongate rotary spindle, means for mounting the rotary spindle alongside the elongate support member, and means for constraining the spindle against excessive bowing in response to wind pressure.

Another object is the provision of a spindle assembly in which a plurality of constraint members engageable with the spindle assembly at intermediate points along its length are employed, and those closer to the hub impose greater constraint than those which are further from the hub to accommodate for variations in apparent wind direction between the rim and the hub caused by spinning of the wheel.

A further object of the present invention is the provision of a spindle assembly having means for constraining the spindle against bowing and which also facilitates easy furling and unfurling of the airfoil. This objective is achieved by providing a constraint member having a body which substantially surrounds the spindle except for a slot for passage of the soft airfoil and a friction reducing member, such as a roller, mounted adjacent the slot for guiding the airfoil through the slot.

Still a further object of the present invention is to provide a spindle assembly with a boom member and means for mounting the boom member for pivotal movement which also partially surrounds the spindle to restrict its movement against bowing.

Still another objective of the invention is the provision of a spindle assembly in which the spindle is mounted for pivotal movement and a constraining means is provided which permits said pivotal movement but constrains the spindle against lateral deflection. In an embodiment described below, the spindle is mounted for pivotal movement about an elongate support member and the constraining means includes a constraint member also pivotally mounted to the elongate support member. The constraint member partially surrounds the spindle at a portion thereof intermediate the ends of the spindle to restrict lateral movement of the spindle portion relative to the elongate support member while enabling pivotal movement of the portion.

Yet a further object of the invention is provision of a spindle assembly for a wind turbine having a spindle apparatus with a constraint member having one section mounted to the wheel and another section substantially surrounding the spindle except for a slot for passage of the airfoil, and means for mounting the other section to the one section for rotary movement about an axis substantially surrounded thereby.

Yet another objective of the present invention is provision of a spindle assembly for a wind turbine with a spindle constraint mechanism having a constraint apparatus which substantially surrounds the spindle except for a slot for passage of the airfoil but yet can be laterally removed or attached to the spindle for repair or construction. In one form, the constraint assembly has two parts which are separable from one another to widen the slot to a dimension greater than the diameter of the spindle to enable lateral removal thereof.

Another object of the present invention is the provision of a spindle assembly for a wind turbine in which a plurality of rotatable airfoil guide members are mounted adjacent the slots of a plurality of constraint members by means of an elongate member extending between and interconnecting the plurality of constraint members, so that the lateral forces are distributed along the length of the elongate member.

A further objective is to provide a spindle assembly such as described above in which the wind resistance of the assembly is minimized while functioning to translate lateral forces developed on the airfoil away from the spindle to suitable anchoring points on the structure of the wind turbine wheel.

A further object is to provide a spindle assembly in which means are provided for mounting a boom for selected rotational and translational movement to vary the distance between the airfoil and the clew supported by the boom to prevent stretching or luffing of the airfoil as the boom's angular position is changed.

BRIEF DESCRIPTION OF THE DRAWINGS

The foregoing objects, features and advantages will be explained in greater detail and further objects, features and advantages will be made apparent from the following detailed description of the preferred embodiments given with reference to the several figures of the drawings, in which:

FIG. 1 is a side view of the constraint mechanism as attached to a spindle with a furled airfoil and boom assembly interposed between the hub and rim of a wind turbine wheel;

FIG. 2 is a side perspective view of the constraint clamp and other parts of the constraint mechanism of FIG. 1 together with a portion of the spindle and furled airfoil;

FIG. 8 is an exploded, perspective view of a fixedly attachable constraint clamp assembly which is modified to allow a portion of the clamp to pivot a controlled amount with respect to the turbine wheel support cables;

FIG. 9 is an exploded, perspective view of another embodiment of the constraint clamp which is similar to that of FIG. 8 but further modified to secure thereto a boom member of the boom assembly;

FIG. 14 is an exploded, perspective view of another embodiment of the constraint clamp with a boom attached for both rotational and translational movement; and FIGS. 15a and 15b are schematic illustrations of the translational and rotational movement of the boom of FIG. 14.

DETAILED DESCRIPTION OF THE PREFERRED EMBODIMENTS

Figure 3A:
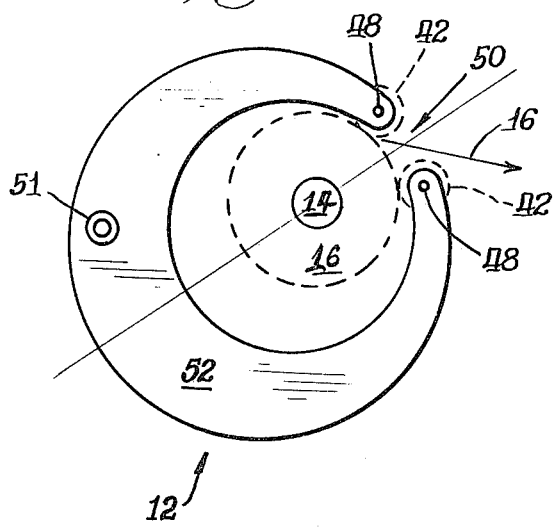
FIG. 3a is a top view of still another embodiment of the constraint clamp of FIG. 1 in which two rollers are attached thereto.

Referring now to the drawings, particularly FIG. 1, one form of the wind turbine spindle assembly 10 is seen as mounted between a hub 20 and a rim 22 of a wind turbine wheel as shown in my aforementioned patent applications. While only one spindle assembly 10 shall be illustrated and described here, it should be understood that in a complete wind turbine wheel, a plurality of substantially indentical spindle assemblies are radially mounted around the turbine wheel.

The spindle assembly 10 includes an elongate spindle 14; an elongate diametral brace cable, or elongate support member 18 mounted in tension between the rim 22 and hub 20; and a constraint mechanism including a plurality of constraint clamps 12 and guide rollers 42. The spindle assembly 10 also includes a boom assembly 26 with an upper, elongate boom member 28 and an lower, elongate boom member 30. A triangular soft airfoil 16 is secured to and furled around the spindle 14 and has a clew 38 supportable by the boom assembly 26 at selected points spaced from the spindle. A plurality of elongate stay cables, or stays, 19 interconnect points on diametral brace cable 18 adjacent constraint clamps 12 to other locations on the wheel.

The spindle 14 is an elongate cylindrical member of suitable lightweight material and is mounted alongside the elongate support member 18 between the wheel hub 20 and the wheel rim 22. A head end 14a is rotatably mounted through a hub plate 44 and connected through universal joint 45 and gears 24 to a suitable rotary drive common to all spindle assemblies on the wheel. When the rotary drive rotates, the spindle 14 rotates about its elongate axis to furl and unfurl the airfoil 16.

A spindle foot 14b of the spindle 14 is rotatably mounted to a pivotally mounted spindle foot plate 32. The spindle foot plate 32, in turn, is pivotably secured to the diametral brace cable 18, adjacent rim 22. Thus, the foot end 14b of the spindle is mounted for pivotal movement about the elongate axis of the diametral brace cable, or support member 18, and the head end 14a is mounted for pivotal movement about an axis passing through universal joint 45. Accordingly, the entire spindle 14 pivots about an axis extending between those two points which is non-parallel to the elongate axis of spindle 14.

The soft airfoil 16 is triangular in shape and is made of strong, lightweight, flexible sheet material such as dacron or the like. One edge of the triangular airfoil 16 is secured to the spindle 14 to rotate therewith, and the body of the airfoil is furled about the spindle 14, so that the free corner of the triangle, or clew, 38 is located near foot end 14b.

The lower boom member 30 is fixedly connected at one end to spindle foot plate 32 and, thus, pivots therewith about brace cable 18. Likewise, inner boom member 28 has one end fixedly joined to one of the constraint clamps 12a which pivots therewith about diametral brace cable 18. Adjacent the boom assembly 26 the elongate axis of the diametral brace cable substantially coincides with the pivot axis of the spindle 14. Thus, both the spindle 18 and the boom assembly 26 are mounted for pivotal movement about a common axis.

The free (outer) ends of upper boom member 28 and lower boom member 30 are secured together at an apex 37 and function to support the clew 38 and the unfurled portion of the airfoil spaced from the spindle 14 by means of a pulley 36 and an outhaul line 34. The pulley 36 is carried at the apex 37 of boom assembly 26. The outhaul line 34 runs from its connection at clew 38 around pulley 36 and back through an eyelet 40 where its one end is attached to foot end 14b of spindle 14. The outhaul line is wrapped about or unwrapped from spindle 14 as it is rotated about its elongate axis. When airfoil 16 is fully furled about spindle 14, as shown in FIG. 1, outhaul line 34 is extended its full length from foot end 14b to pulley 36 and to clew 38 with little or no slack. As spindle 14 is rotated, outhaul line 34 is taken up at spindle foot 14b and clew 38 is drawn towards the apex of boom assembly 26 as the airfoil 16 is unfurled from spindle 14.

The angle of this airfoil relative to the plane of the turbine wheel and thus to the wind is controlled by pivoting boom assembly 26 about diametral brace cable 18. Such pivotal movement is accomplished by controlling the tension in a sheet, or line, 46 secured to the wheel to allow the airfoil to move in response to wind pressure to a selected angular position before the wind. Once unfurled and before the wind, this wind pressure is translated by airfoil 16 to place stresses at various locations along spindle 14 which tend to cause it to laterally deflect or bow. If the lateral deflection becomes too severe, wind pressure will be lost from the airfoil. However, in keeping with my invention, the substantial lateral deflection is prevented by constraint clamps 12 secured to diametral brace cable 18 at various locations along the length of spindle 14.

Still referring to FIG. 1, it is seen that individual pairs of a plurality of elongate friction reducing members, such as rollers 42, are respectively connected between each of the constraint clamps 12c, between the hub plate 44 and the uppermost clamp 12, and between the spindle foot plate 32 and the lowermost clamp 12a. While rollers are described herein, other friction reducing members, such as Teflon coated rods or the like, could be used. The rollers 42 are mounted for rotation about elongate rods, or cables 48 (FIG. 2), which interconnect the constraint clamps 12. These rollers 42 define therebetween an elongate slot for passage of the airfoil 16 along the entire length of spindle 14. The rollers 42 receive the forces developed on the unfurled airfoil 16 such that they are not borne by the spindle 14. The lateral deflection forces received by rollers 42 are instead transferred to the clamps 12, and then are resolved along the diametral brace cable 18 and stays 19 to various points on the wind turbine wheel axle structure (not shown) and rim 22.

As shown in my aforementioned application, Ser. No. 234,963 the axle structure extends perpendicularly outward from the center of the wheel, and the stays 19 are preferably secured to the points on the axle structure furthest from the wheel.

Referring now to FIG. 2, the relationship between the constraint clamps 12 and the remainder of the spindle assembly 10 is more clearly illustrated. Each clamp 12 has a planar, plate-like body 52 with an opening 17 therethrough for receipt of the spindle 14 and furled portion of airfoil 16 and a slot 50 connected with opening 17 for passage therethrough of the unfurled portion of airfoil 16. Located opposite slot 50 is a cylindrical bearing 51 for pivotal connection of clamp 12 to diametral brace cable 18, so that clamp 12 will pivot with pivotal movement of the spindle 14.

The pairs of rollers 42 are mounted for rotary movement about a pair of rods 48. The rods 48 are connected to hub plate 44 at one end and to spindle foot plate 32 at their other end, and extend through openings 55 in clamp plates 52, which openings are adjacent each other on opposite sides of slots 50. The rollers form a low friction rotary bearing surface for spindle 14 and the rods 48 function to distribute any lateral bearing forces longitudinally along their length.

In a sailboat, the actual direction of the wind has a constant relationship to the apparent direction of the wind relative to the airfoil along its entire surface. Accordingly, any twisting or warping of the airfoil along its vertical length inherently alters the angular direction of the airfoil surface relative to the apparent direction of the wind. Accordingly, to optimize efficiency in a sailboat, all twisting or warping of the airfoil should be eliminated. In a wind turbine, on the other hand, the spinning of the wheel creates an apparent wind component parallel to the plane of the wheel. This component is greatest at the rim where the linear velocity of the wheel is greatest and linearly decreases from this maximum to zero at the center of the hub. Accordingly, if the actual wind direction is normal to the plane of the wheel near the hub, the apparent wind direction will be at a small angle offset from the normal direction. This angle increases with increased distance from the hub.

In order to compensate for this phenomenon and to keep the angle of the apparent wind direction relative to the airfoil substantially the same along its entire surface from adjacent the hub to adjacent the rim, the constraint clamps are designed to pivot so that a greater amount of pivoting of the spindle and the airfoil it carries about the support member 18 occurs adjacent the rim than occurs adjacent the hub. This is achieved by allowing clamps 12 to pivot to their most appropriate angle about brace 18 in response to wind force. In addition, by selectively dimensioning the size of the spindle openings 17 and their distance from bearing 51, both a greater amount of pivoting of the spindle is permitted and a larger amount of furled airfoil is accommodated by clamps 12 located further from the hub than by clamps 12 located closer to the hub. The distance between the spindle 14 and the brace cable 18 increases from the hub 20 to the rim 22. Accordingly, the distance between the spindle openings 17 and bearing 51 for the clamps 12 at different radial locations are varied to accommodate these differences. As a result of this differential pivoting of clamps 12, the airfoil assumes a controlled twist in its conformation which matches the angular change in apparent wind from rim to hub to significantly improve the efficiency of the wind turbine.

While constraint clamps 12 may be mounted at a variety of positions along diametral brace cable 18, it is preferred that the clamps be mounted adjacent the junctions of stays 19 with diametral brace cable 18. This allows the forces developed on airfoil 16 to be transmitted from rollers 42 and cables 48 to the clamps 12 and directly along the stays 19 to points on the axle of the turbine wheel.

Figure 3B:
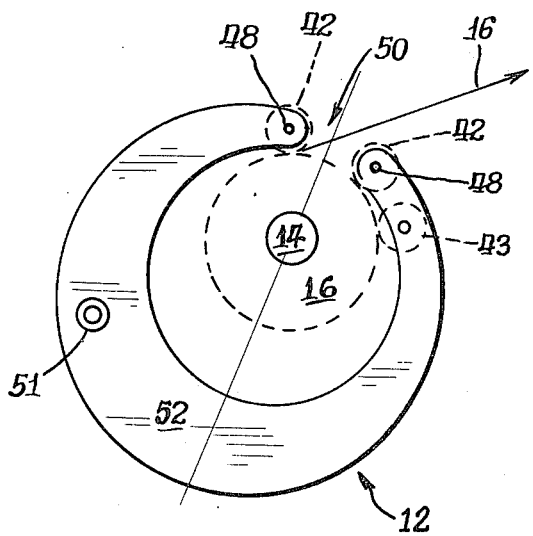
FIG. 3b is a top view of still another embodiment of the constraint clamp in which three rollers are secured thereto.

Alternative embodiments of constraint clamp 12 are shown in FIGS. 3a and 3b. In FIG. 3a a constraint clamp 12 is provided with a more rounded body than in FIG. 2 and the cylindrical bearing 51 is offset from the center slot 50 rather than being directly opposite slot 50.

Diametral brace cable 18 passes through cylindrical bearing 51, and clamp 12 pivots about cable 18 thereat. As illustrated in FIG. 3a, the rollers 42 not only transmit force from the airfoil 16 to the clamps 12, but also act as bearing surfaces against which the furled airfoil rotates as the spindle is rotated.

In FIG. 3b, bearing 51 is even further offset from a point directly opposite slot 50. Also, a third roller 43 has been added to provide an additional bearing surface by which force of the wind is transmitted to the clamps 12.

Figure 4:
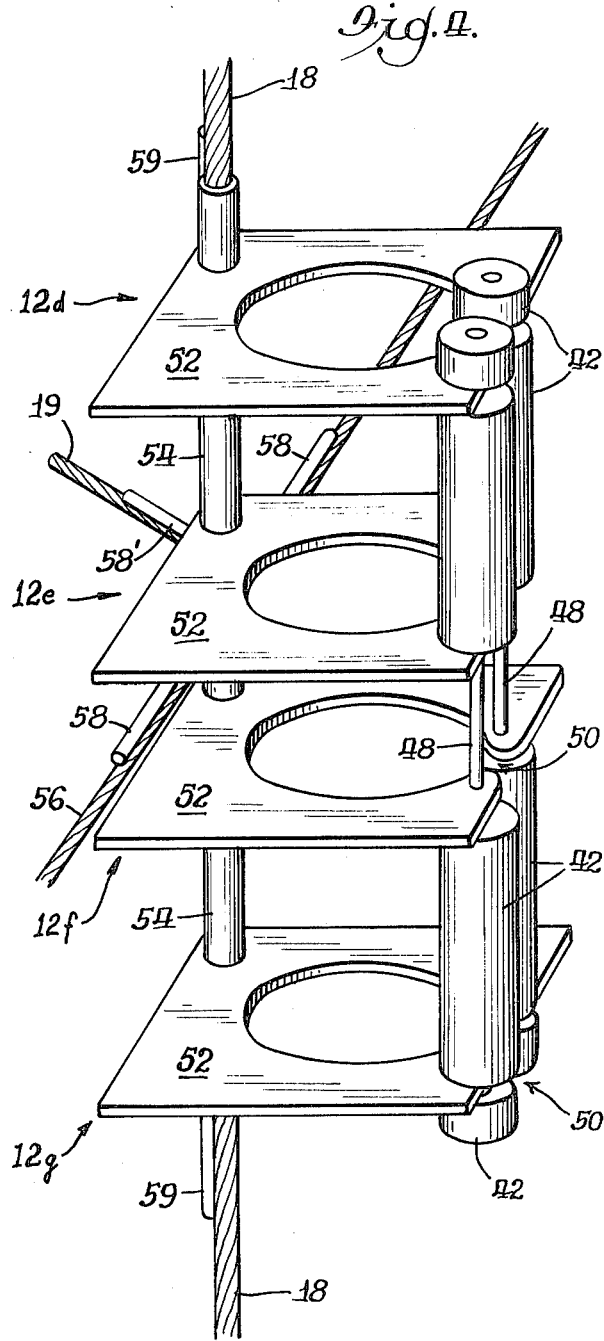
FIG. 4 is a perspective view of a plurality of constraint clamps secured to a common tube at the intersection of various support cables of the wind turbine.

Referring to FIG. 4, an alternative embodiment is shown in which a gang of constraint clamps 12d–12g are employed in place of an individual clamp 12 at junction points of diametral brace cable 18 with cable stays 19. In this embodiment, the rollers 42 may extend along substantially the entire length of the spindle, as shown in FIG. 1, or may be coextensive only with each gang of clamps. As seen, four constraint clamps 12d–12g are joined together by an elongated bearing tube 54. Bearing tube 54 takes the place of individual bearing cylinders 51 at the joinder of cable stay 19 with cross brace cable 56 and diametral brace cable 18. The diametral brace cable 18 extends through the bearing tube 54 for pivotal movement of the gang of clamps 12 thereabout. Other embodiments of this same concept would comprise only two or three clamps grouped at a particular point along spindle 14.

A plurality of metal fingers 58, 58' are provided to secure the assembly to a cross brace 56 and a back stay 19. The three fingers 58, 58' are fixedly mounted to the bearing tube 54. Finger 58' extends parallel to one of the back brace cables 19, and finger 58 is parallel a cross brace cable 56. The cables 19 and 56 lie in planes transverse to diametral brace cable 18. The fingers 58, 58' are secured to the cables 19 and 56 by C-clamps (not shown) or the like, and fingers 59 are similarly secured to cable 18. Clamps 12 and bearing tube 54 are therefore held at their proper location and transmit lateral forces to the rim and axle of the turbine wheel structure.

Figure 5:
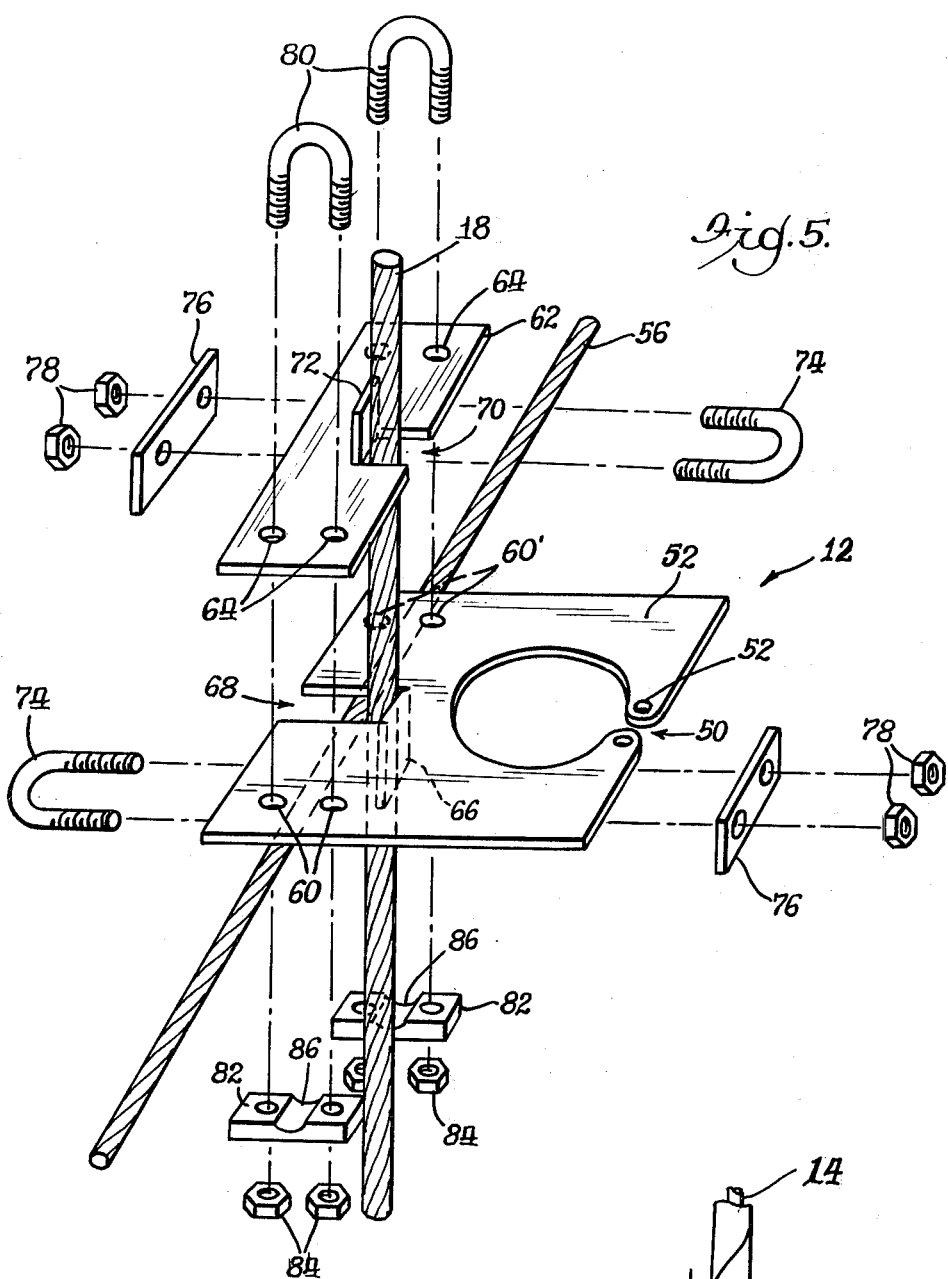
FIG. 5 is an exploded, perspective view of a further embodiment of a constraint clamp and means for fixedly attaching it to turbine support cables.

Referring to FIG. 5, a further embodiment is shown in which clamp 12 has been modified to be rigidly affixed to diametral brace cable 18 and cross brace 56. The clamp 12 has two pairs of openings 60, 60' which lie on opposite sides of cross brace cable 56. A rectangular tab 66 is cut in clamp plate body 52 and bent to form slot 68 to receive diametral brace cable 18. The clamp 12 is secured by means of a mounting plate 62. Mounting plate 62 also has a tab 72 at the inside edge of slot 70 similar to slot 68 of clamp plate body 52 and mounting plate 62 overlies clamp plate body 52 with diametral brace cable 18 passing through both slots 68 and 70. Tabs 66 and 72 extend in opposite directions and opposite sides along brace cable 18, and U-bolts 74, plates 76 and nuts 78 are used to clamp tabs 66 and 72 to diametral brace cable 18.

Two pairs of openings 64 are located opposite the two pairs of openings 60 of clamp plate body 52. U-bolts 80 pass through the aligned pairs of openings 64 of plate 62 and extend past cross brace cable 56 and through aligned holes in plates 82. Plates 82 have depressions 86 therein in which cross brace 56 rests, and nuts 84 screwed on the ends of U-bolts 80 tightly secure plate 62 and clamp plate body 52 together around cross brace cable 56, such that clamp 12 is rigidly held against pivoting about diametral brace cable 18.

Figure 6:
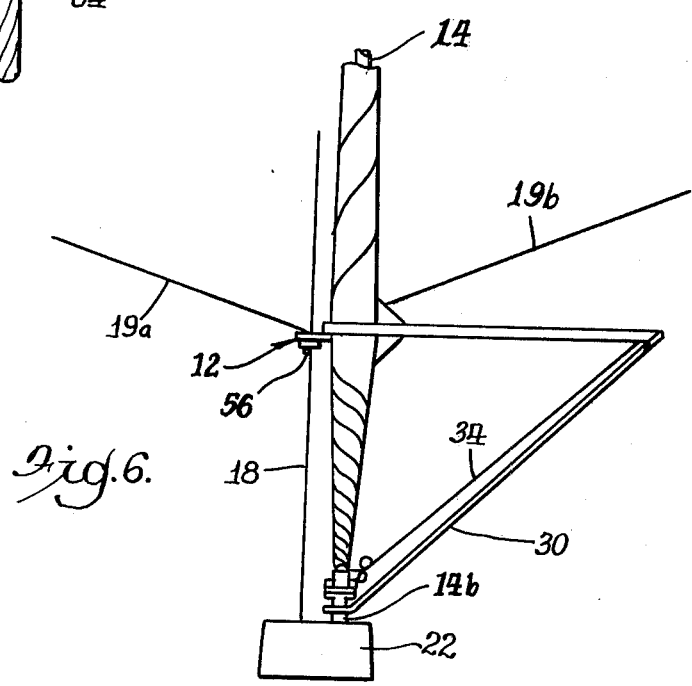
FIG. 6 is a side view of a section of a spindle assembly which is fixedly, rather than pivotably mounted alongside a diametral brace cable of the wind turbine wheel.

The embodiment of FIG. 5 is particularly useful for turbine wheels in which a non-pivotal spindle assembly is employed such as shown in FIG. 6. Referring to FIG. 6, it is seen that spindle foot 14b of spindle assembly 14 is fixedly mounted in rim 22 of the wind turbine wheel instead of being pivotably mounted. In an assembly such as that of FIG. 6, the constraint clamps 12 are rigidly affixed to diametral brace cable 18 instead of being pivotably mounted.

Figure 7A:
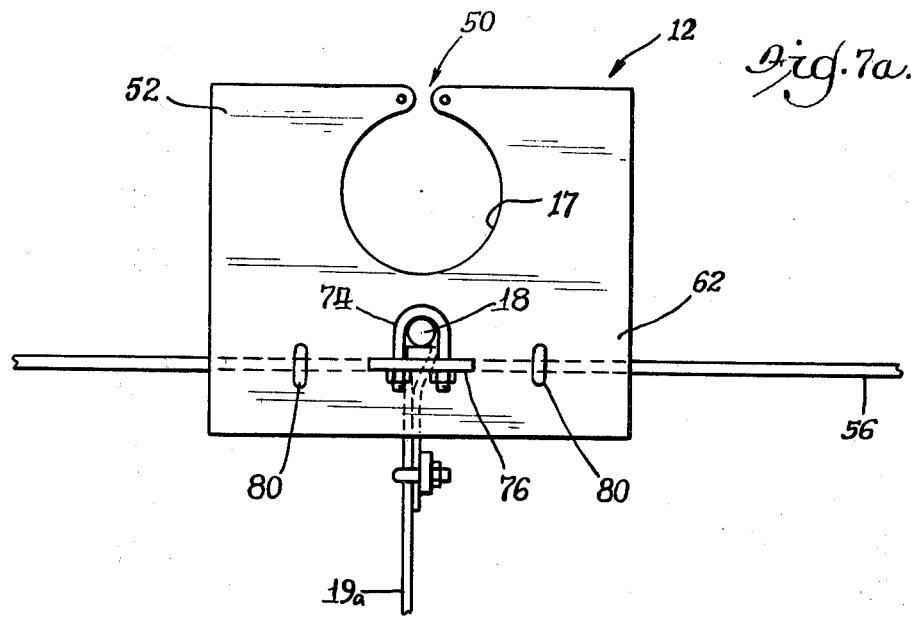
FIG. 7a is a top view of the embodiment of FIG. 5.

Referring to FIG. 7a, a plan view of the clamp assembly of FIG. 5 as assembled is shown. Slot 50 is directly opposite diametral brace cable 18 and back stay 19a. This enables the lateral forces applied to the spindle 14 (not shown) to be transmitted directly along cables 18, 56 and 19a.

Figure 7B:
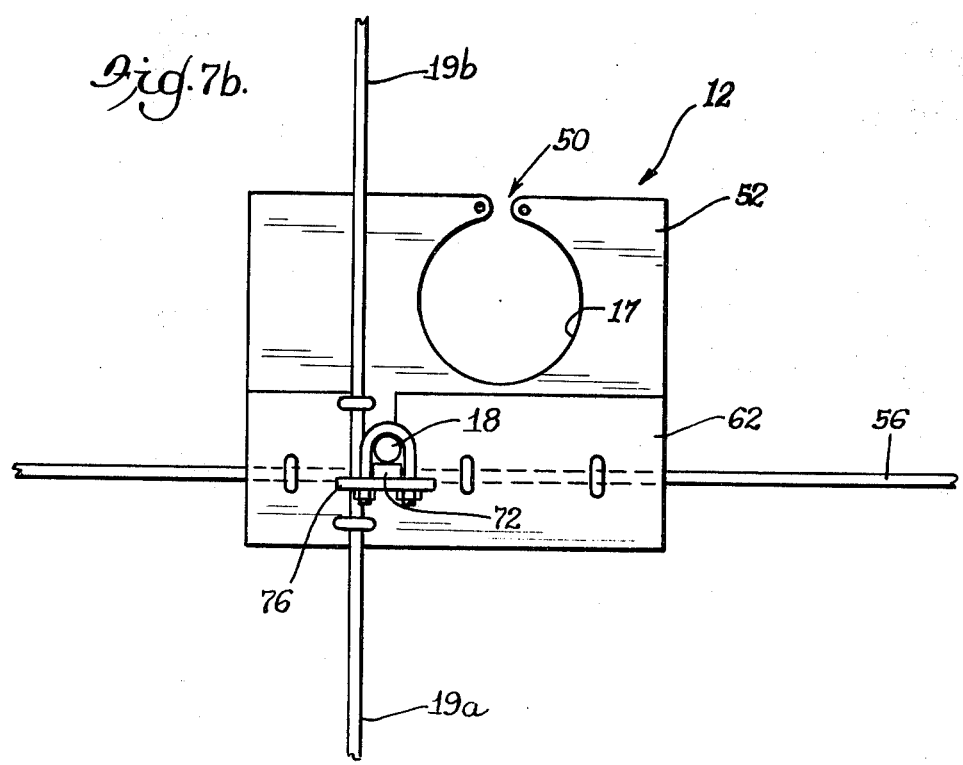
FIG. 7b is a top view of another embodiment of the constraint clamp which is fixedly mounted and in which the spindle opening is displaced from the center of the clamp.

In FIG. 7b, an alternative embodiment of the clamp assembly of FIG. 5 is shown in which slot 50 and the spindle opening 17 are offset to the side of the point of intersection of the various cables 18, 56, and 19. This alternative is preferred when a forestay 19b is employed. Forestay 19b is a continuation of back stay 19a and secured to a part of the wind turbine wheel which is not shown. It provides a fourth direction of support to clamp 12. The offset is needed to avoid interference to the forestay 19b with the spindle.

While maintaining the constraint clamp 12 fixedly attached to the diametral brace cable when the spindle is non-pivotal, it is also sometimes desirable to allow a selected amount of rotary movement of the constraint clamp plate body 52 about an axis passing through the opening 17 while restraining clamp assembly 12 from pivoting about cable 18.

FIG. 8 illustrates an alternative embodiment of constraint clamp 12 in which this is achieved. The constraint apparatus has one section, a clamp plate 88, to which a clamp plate body 52 is slideably secured by means of pin members or screws 94, and nuts 96. The clamp plate 88 is fixedly secured to diametral brace cable 18 and cross brace cable 56 by U-bolts 74, plates 76 and nuts 78 in a manner similar to the like mounting shown in FIGS. 7a and 7b. Screws 94 pass through cylindrical bearings 92, through arcuate slots 90 in plate 88, and then through screw holes 97 in clamp plate 52. Double nuts 96 are then screwed to the ends of screws 94. The arcuate guide slots are sections of circles having their common center axis within spindle opening 17. The bearings 92 slideably ride in arcuate slots 90, so that clamp plate body 52 may rotate to the extent allowed by slots 90 around a center axis which extends through spindle opening 17.

Shown in FIG. 9 is a further embodiment in which the mounting principles illustrated in FIG. 8 are employed to mount a boom member for pivotal movement. As seen, a boom member, either upper boom member 28 or lower boom member 30 of boom assembly 26 is connected to a hook shaped clamp 98. Clamp 98 is mounted to clamp plate 88 for sliding rotary movement in the same manner as clamp plate body 52 is mounted thereto in FIG. 8. Clamp 98 also partially defines the spindle opening 17 and functions to constrain the spindle against lateral deflection. In that regard, opening 100 of clamp 98 corresponds to slot 50 of prior embodiments. By this arrangement, a pivotable boom assembly is provided adjacent spindle 14 which does not interfere with the rotation of spindle 14 about its longitudinal axis or with the furling or unfurling of the airfoil 16.

Figure 10A:
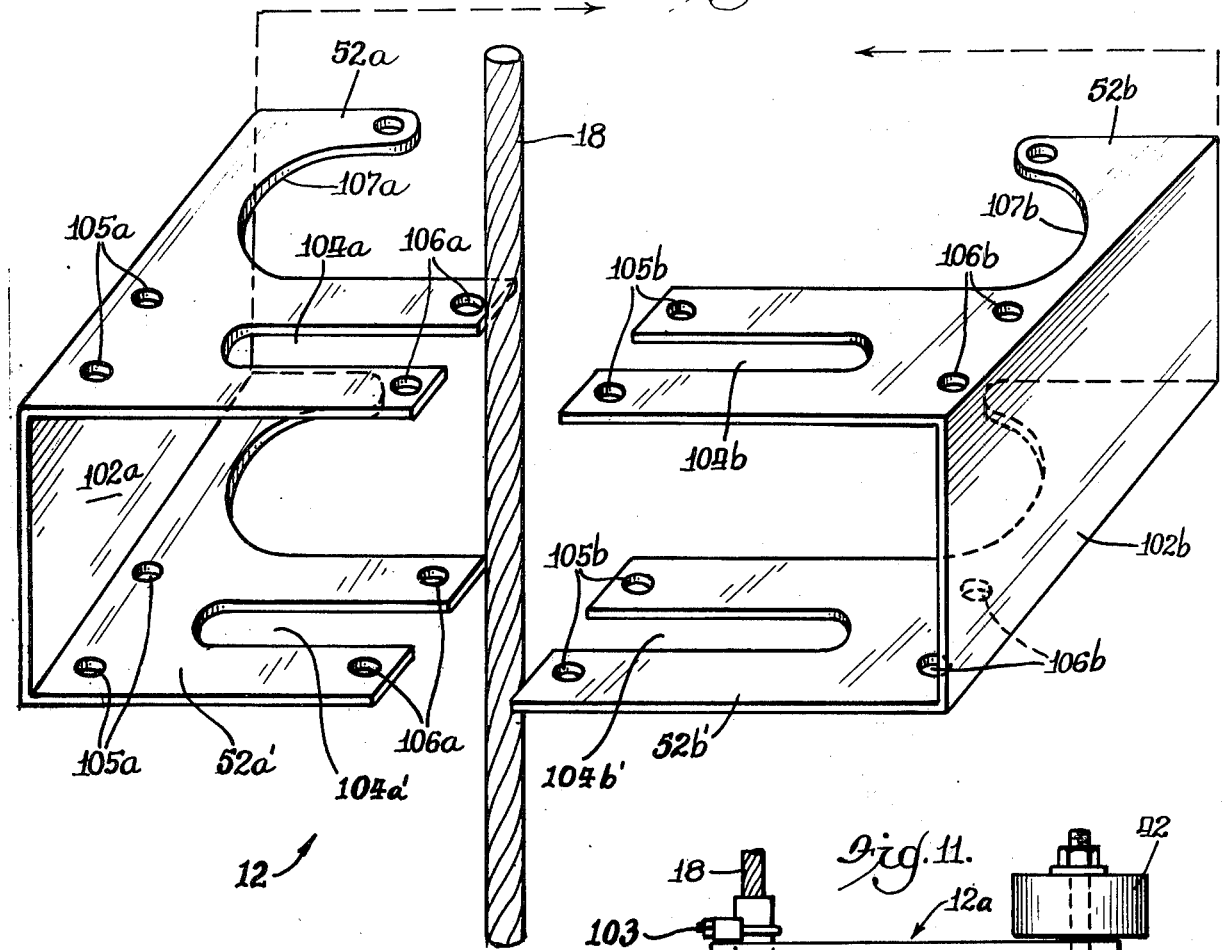
FIG. 10a is a perspective view of a pair of constraint clamps formed in two parts to allow disassembly of the clamps without disassembly of the supporting cables of the turbine wheel.

In keeping with a further aspect of my invention, a constraint clamp assembly 12 is provided with means for enlarging the slot to permit lateral removal or attachment to the spindle. One embodiment of this concept is shown in FIGS. 10a and b which illustrate a clamp 12 having a pair of identical clamp sections 52a, 52a' and 52b, 52b' connected by walls 102a and 102b. Clamp section 52a has a pair of aligned slots 104a, 104a' and clamp section 52b has a pair of aligned slots 104b, 104b'. Pairs of openings 105a and 105b and 106a and 106b in clamp sections 52a, 52a' and 52b, 52b' receive bolt fasteners or the like to secure the two clamp sections together.

Figure 10B:
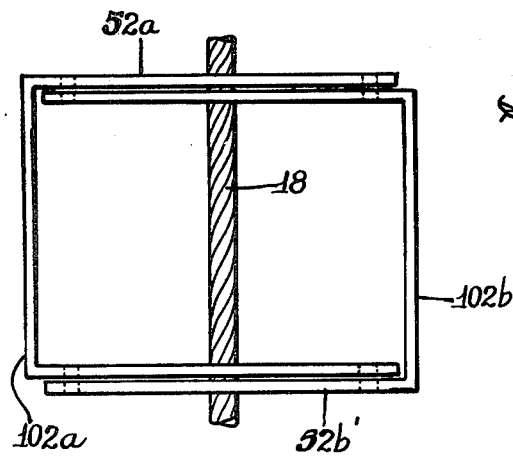
FIG. 10b is a side view of the two parts of the clamps of FIG. 10 when mated together.

The constraint clamp 12 is secured around diametral brace cable 18 when clamp sections 52a and 52b are brought together as shown in FIG. 10b. Openings 105a align with openings 105b, and openings 106a align with openings 106b. This alignment brings slots 104a and 104b together to tightly surround diametral brace cable 18. Arcuate portions 107a and 107b define the walls of spindle opening 17, and a slot 50 remains for passage of the airfoil. The clamp is laterally removed from brace cable 18 by releasing the fasteners and separating the two clamp sections 52a and 52b to enlarge slot 50 to a dimension greater than the dimensions of the spindle and furled airfoil.

Figure 11:
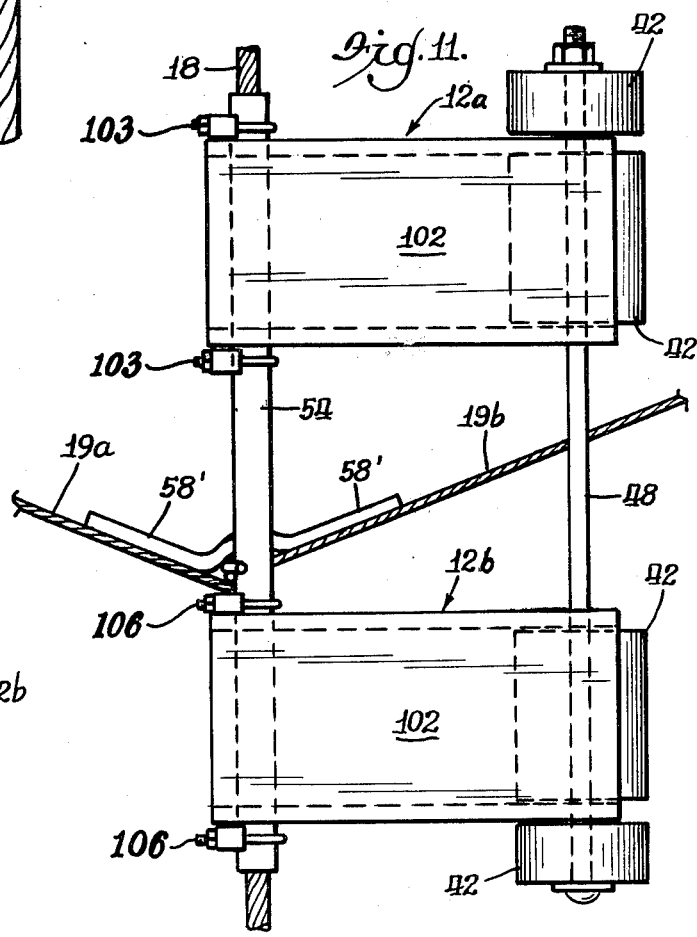
FIG. 11 is a side view of a pair of the clamps of FIGS. 10a and 10b as attached to the support cables of a wind turbine.

As illustrated in FIG. 11, the clamp 12 of FIG. 10 can be located above or below points of intersection of the various support stays with diametral brace cable 18. As disclosed in both FIGS. 10a and 11, the paired clamps 12 are mounted for pivotable movement about cable 18. However, means such as shown in FIG. 5 can be incorporated to render the clamps 12 fixedly secured with respect to diametral brace cable 18.

In FIG. 11, the slots 104a and 104b are secured to a bearing tube 54 surrounding cable 18 to minimize wear. One or more of the clamp sections 12a and 12b are supported on bearing tube 54 by pairs of U-bolt assemblies 103, 106 to make a gang of clamps. Also rollers 42 are mounted to two or more sets of paired clamps 12 by bolts or rods 48 which interconnect two or more of clamps 12a, 12b in a manner analogous to that shown in FIG. 1.

Figure 12:
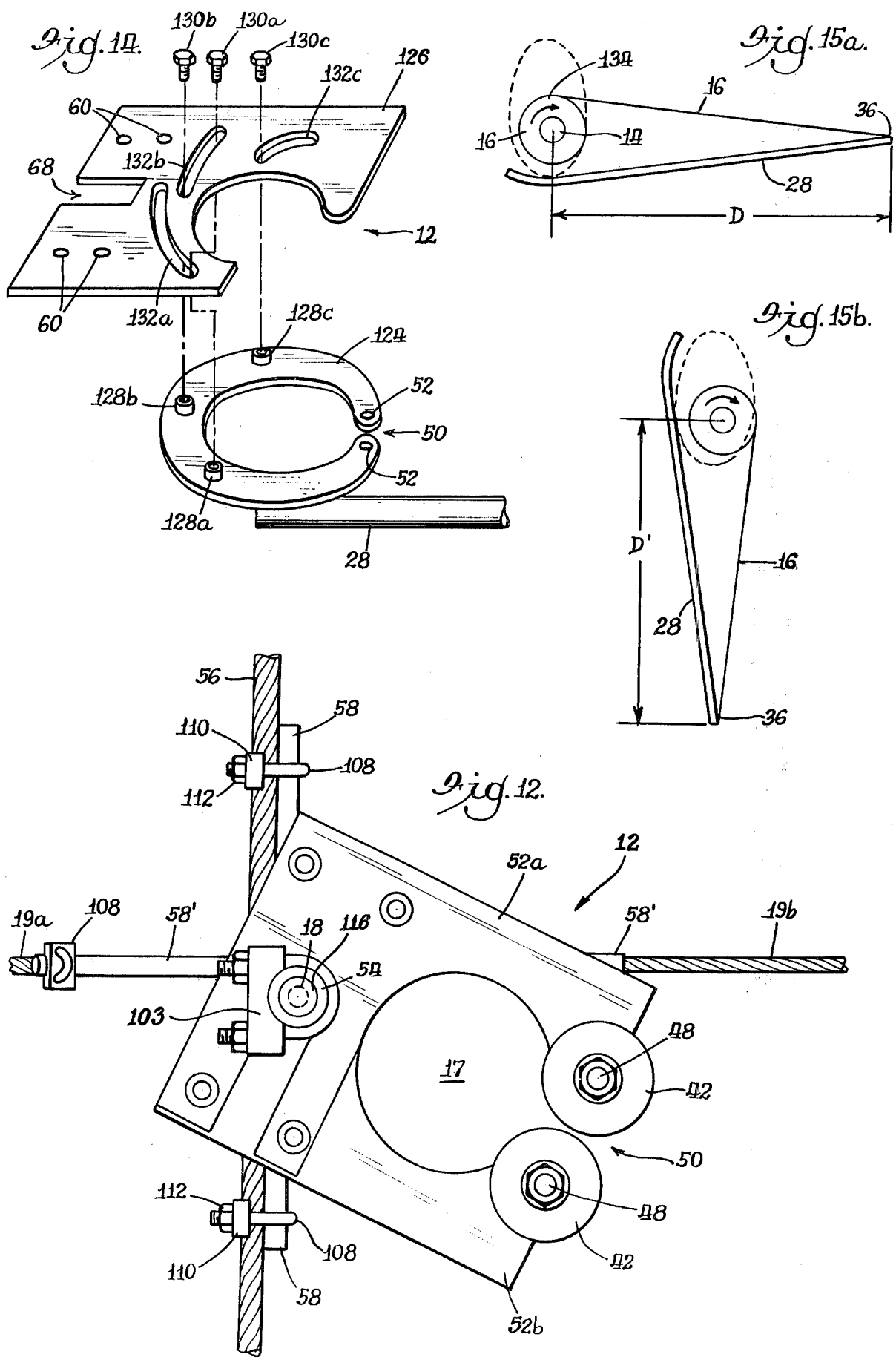
FIG. 12 is a top view of the constraint clamp of FIGS. 10a, 10b and 11 as assembled and connected to support cables of a wind turbine wheel.

As seen in FIG. 12 when the pair of clamps 52a and 52b are merged, the resulting constraint clamp 12 is similar in appearance to that shown in FIG. 2. Unlike the clamp 12 of FIG. 2, however, clamp 12 shown in FIGS. 10a, 10b, 11 and 12 may be assembled and attached to the diametral brace cables 18 after the construction of the wind turbine and connection of brace cables 18 and the spindles 14. After construction, the clamp may be serviced or replaced without dismantling the turbine by simply disconnecting the bolts and separating the two clamp sections 52a and 52b. The number and positioning of the clamps on the spindle may be varied without disconnecting any parts of the wind turbine itself to respond to long term changes in ambient wind conditions.

As a further alternative, the connecting walls 102 may be eliminated to provide a single clamp 12 defined by half clamps 52a and 52b. Such a clamp may be used where paired clamps would provide an excess of material with respect to prevailing winds.

In FIG. 12, fingers 58, 58' are fixedly attached at tube 54 and are located parallel to cross brace cable 56, backstay 19a and forestay 19b. U-bolts 108, metal brackets 110 and nuts 112 secure fingers 58, 58' to the various cables and stays of the wind turbine and secure the assembled constraint mechanism in its proper position within the turbine wheel assembly.

Figure 13:
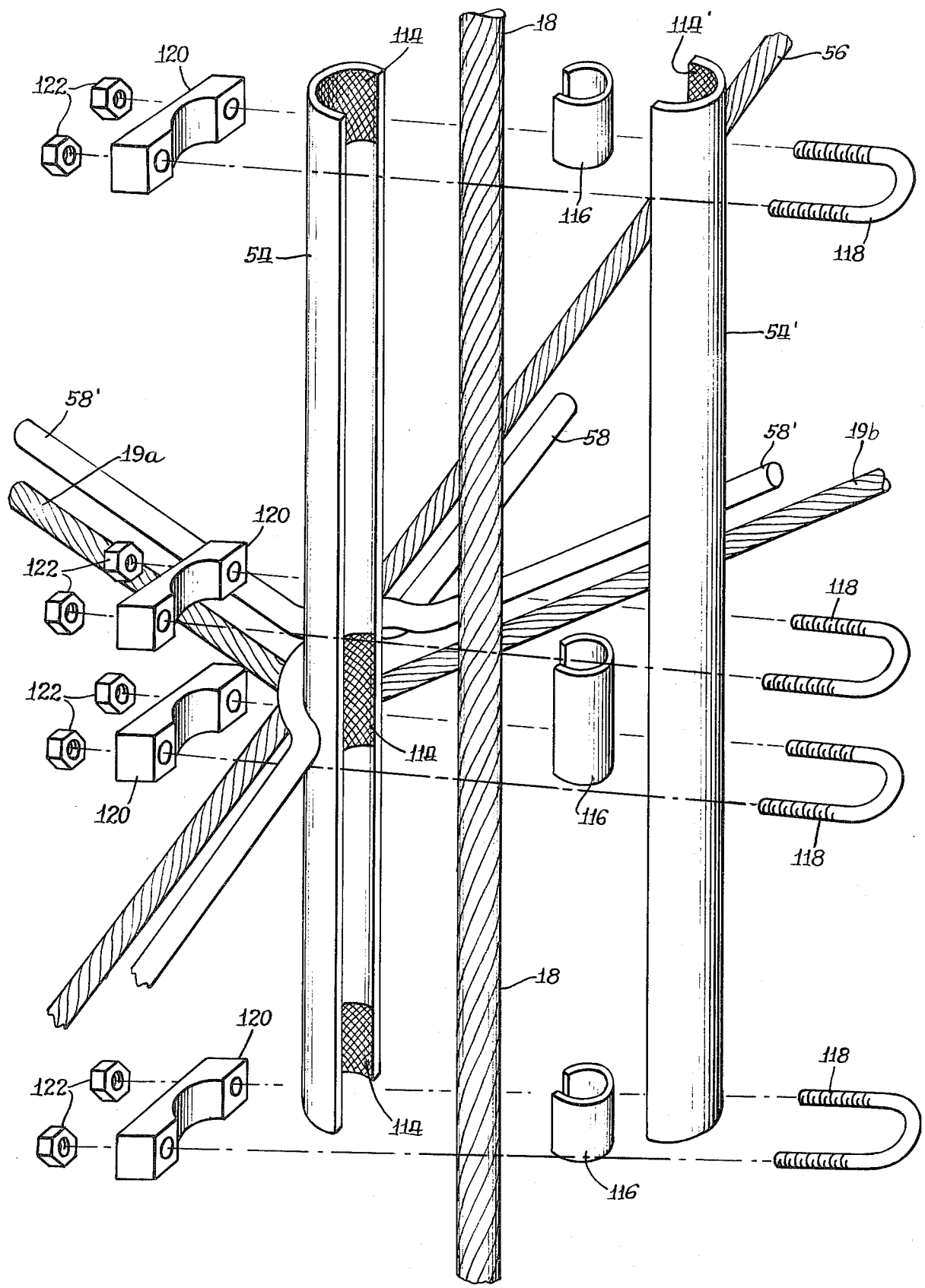
FIG. 13 is an exploded, perspective view of a bearing tube to which is mounted the constraint clamp which is split to facilitate easy connection thereof with the support cables of a wind turbine wheel.

As shown in FIG. 13, fingers 58, 58' are parallel to the cables and stays of the wind turbine and cross the bearing tube 54 at the common intersection of the cables and stays. The fingers 58 are welded to the bearing tube 54 at their intersection therewith. Accordingly, bearing tube 54 is restrained against rotation about diametral brace cable 18, and the entire assembly is fixedly secured at the intersection.

FIG. 13 also illustrates a bearing tube 54 which is split longitudinally into two equal halves 54, 54' to facilitate assembly and maintenance of the constraint mechanism. Such a split bearing tube 54, 54' may be assembled after the various cables and stays of the wind turbine have been secured. Likewise, it is removable without the need for dismantling other parts of the spindle or turbine wheel assembly.

The bearing tube halves 54, 54' are provided with inner knurled surfaces 114, 114'. Shims 116 are mounted in bearing tube 54 in registry with the inner knurled surfaces 114, 114' of tube 54 to increase gripping action. After the two halves of the bearing tube 54, 54' are assembled around diametral brace cable 18, they are tightly secured together by means of U-bolts 118, metal brackets 120 and nuts 122. The inner knurled surfaces 114, 114' and shims 116 then cooperate to restrain the bearing tube 54 from pivoting about cable 18 or sliding along its length. With fingers 58, 58' welded to the bearing tube 54 and secured to the cables and stays, the bearing tube 54 forms a strong, yet lightweight, structure to mount the constraint clamp 12 and rollers 42 and to transfer the forces developed on the airfoil to the wheel.

Referring now to FIGS. 14, 15a and 15b, another embodiment of my invention is shown which is similar in many respects to the embodiments of FIG. 9. This principal difference is that clamp 12 and boom 28 or 30 are mounted for both translational and rotational movement to eliminate or minimize the need for adjustment of the clew's position to prevent stressing or luffing during rotation of the boom. Referring specifically to FIG. 14, the constraint clamp 124 is slideably secured to a clamp plate 126 by means of tapped pins 128a, 128b and 128c attached to clamp 124 and screw fasteners 130a, 130b, and 130c. The clamp plate 126 has a slot 68 and mounting holes 60 and is fixedly mounted to diametral brace cable 18 and cross brace cable 56 in the same fashion as the clamp plate 88 of FIG. 8 is mounted. For purposes of simplicity, the cables and other mounting apparatus are not shown here. The boom, either upper boom 28 or lower boom 30, has one end fixedly secured to the outer side of clamp 124.

Clamp plate 125 has three guide slots 132a, 132b, and 132c through which pins 128a, 128b, and 128c extend, respectively, from beneath plate 126. Screw fasteners 130a, 130b and 130c screw into the tops of pins 128a, 128b and 128c, respectively, on the opposite side of clamp plate 126.

Unlike the circular section guide slots 90 of FIG. 8, the guide slots 132a, 132b and 132c are eccentric to impart a translation movement of the free end of the boom relative to spindle 14 as its angular position relative to the boom is changed. Specifically, the slots 132a, 132b and 132c are designed so that the amount of translational movement of the boom for a given amount of angular movement corresponds to the amount of airfoil which is wrapped or unwrapped from the spindle during rotation of the boom. That is, the slots 132a, 132b and 132c cause the desired distance of the outhaul pulley 36 at the end of the boom or other airfoil supporting point from the spindle to vary as a function of the angular position of the boom.

Referring to FIGS. 15a and 15b, the rotational and translational movement resulting from the embodiment of FIG. 14 is illustrated. Presuming the airfoil 16 is wrapped around spindle 14 in the direction of arrow 134, as shown, then as the boom is rotated from its angular position shown in FIG. 15a to that of FIG. 15b, the distance D is shortened to D' an amount substantially equal to the shortening of the unfurled portion of airfoil 16 being wrapped another quarter turn around spindle assembly 14. When the boom is rotated in the opposite direction, this distance is lengthened by an amount substantially equal to the lengthening of the unfurled portion of the airfoil due to unwrapping. Consequently, the position of the clew along the boom does not have to be adjusted to avoid luffing or stressing of the airfoil during rotation of the boom.

While several particular embodiments have been disclosed here to illustrate the concepts of my invention, it should be appreciated that many variations may be made without departing from the scope of my invention as defined on the claims. For example, except where otherwise indicated or inappropriate, the mounting techniques and configurations of the clamp shown in one embodiment may be used in the other embodiments. Other variations are also contemplated. For instance, the planar rotary clamp of FIGS. 8 and 9 may be replaced by a cylindrical clamp with guide slots along its side which mate with a suitable fixedly mounted plate or other member. Also, while the guide rollers 42 have only been shown as mounted partially within and partially without the spindle opening, the guide rollers 42 may be mounted entirely within the spindle opening of the clamp.

I claim:

1. An anti-bowing spindle constraint assembly for a wind turbine having a wheel with an axle suspended from a rim, said axle having a hub, an elongate spindle mounted radially between said hub and said rim in a manner minimizing force loading thereof along its elongate axis, said spindle carrying a soft airfoil furled thereabout and mounted for rotation about its elongate axis to permit furling and unfurling of said soft airfoil, an elongate boom assembly pivotally mounted adjacent said rim for supporting at a point along the length thereof the unfurled clew portion of said airfoil spaced from said spindle and for changing the angle of attack of said airfoil with respect to the wind, and an elongate support member mounted in tension between said hub and said rim adjacent said spindle, comprising in operative combination:

(a) means for constraining the spindle against excessive lateral bowing in response to wind pressure on said airfoil when at least a portion thereof is unfurled, including:

(b) means for receiving said airfoil furled on said spindle disposed intermediate said rim and said hub, (i) said receiving means defining a space permitting freely winding or unwinding said airfoil from said spindle upon rotation of said spindle about its elongate axis, and (ii) said receiving means providing a slot communicating with said space for passage therethrough of said airfoil upon furling or unfurling of said airfoil;

(c) means for transmitting lateral pressure from said spindle to said receiving means mounted to said receiving means adjacent said slot;

(d) means for reducing friction on said airfoil as it passes through said slot mounted in engagement with said airfoil and in association with said pressure-transmitting means;

(e) means for mounting said receiving means to said support means at a position radially outwardly from the hub end of said spindle to transfer at least a portion of said lateral bowing pressure on said spindle to said support means while permitting free axial rotation of said spindle for furling and unfurling of said airfoil, and permitting pivoting of said boom through an angle for change of said angle of attack of said airfoil.

2. A spindle constraint assembly as in claim 1 wherein said mounting means for said receiving means includes means for pivotal movement of said constraint assembly about an axis substantially parallel to the axis of said support member.

3. A spindle constraint assembly as in claim 2 wherein said pivotal means includes a cylindrical sleeve for receipt therethrough of said elongate support member for pivotal movement of said receiver means thereabout.

4. A spindle constraint assembly as in claim 3 wherein:

(a) said constraining means includes a plurality of said receiving means disposed laterally spaced from each other along the elongate axis of said spindle; and (b) said mounting means includes means for interconnecting at least one pair of adjacent receiving means and maintaining them in said spaced-apart relationship.

5. A spindle constraint assembly as in claim 4 wherein:

(a) said lateral pressure transmitting means interconnects said plurality of receiving means, and (b) said friction reducing means is mounted to span at least a portion of the distance between at least one pair of adjacent receiving means.

6. A spindle contraint assembly as in claim 5 wherein said spindle is mounted with its elongate axis spaced laterally farther away from the axis of said support member at said wheel rim end than at said hub end.

7. A spindle constraint assembly as in claim 5 wherein said friction reducing means comprises at least one elongate roller.

8. A spindle constraint assembly as in claim 7 wherein said friction reducing roller extends substantially the entire distance between at least some of said adjacent receiving means.

9. A spindle constraint assembly as in claim 8 wherein said lateral pressure transmitting means is a cable mounted under tension extending substantially the entire length of said elongate spindle.

10. A spindle constraint assembly as in claim 9 wherein there are at least two rollers, with at least one being disposed on each side of said slot.

11. A spindle constraint assembly as in claim 10 which includes:

(a) at least one means for laterally bracing said support member disposed intermediate the hub and the rim; and (b) said mounting means for said receiving means is mounted adjacent said bracing means to transfer some of the lateral pressure on said spindle to said wheel by said brace.

12. A spindle constraint assembly as in claim 11 wherein:

(a) said pivot means of said mounting means includes a cylindrical sleeve receiving said support member; and (b) said lateral bracing means includes a tang mounted on said sleeve for securing thereto a stay selected from at least one of a backstay and a crossbrace stay.

13. A spindle constraint assembly as in claim 11 wherein said spindle is mounted with its elongate axis spaced laterally farther away from the axis of said support member at said wheel rim end than at said hub end.

14. A spindle constraint assembly as in claim 11 which includes:

(a) a plurality of receiving means spaced from each other along the elongate axis of said spindle, the spaces defined in said receiving means located farther from said hub being larger than those closer to said hub.

15. A spindle constraint assembly as in claim 11 wherein:

(a) said mounting means for said receiving means substantially surrounds and is laterally removable from said support member.

16. A spindle constraint assembly as in claim 15 which includes:

(a) at least one elongated finger member securable to at least one support member attached to a portion of said laterally removable mounting means.

17. A spindle constraint assembly as in claim 9 wherein said roller is substantially coextensive with the elongate spindle.

18. A spindle constraint assembly as in claim 2 wherein:
(a) said receiving means comprises a first member secured to said elongate support member and a second member surrounding a portion of said spindle to define said spindle space and said airfoil slot; and
(b) said pivot means comprises means for mounting said second member to said first member for relative rotary motion about an axis intersecting said spindle and airfoil assembly.

19. A spindle constraint assembly as in claim 18 wherein said pivot means includes:
(a) means in association with one of said members for guiding the rotary motion of the other of said members; and
(b) means in association with said other member for following said guide means to permit rotary motion of said other member.

20. A spindle constraint assembly as in claim 19 wherein said guide means includes a slot, and said follower means includes rollers engaging said slot.

21. A spindle constraint assembly as in claim 20 wherein said second member has means for securing thereto an end of a boom member of said boom assembly so that said boom member pivots with said second member.

22. A spindle constraint assembly as in claim 2 wherein:
(a) said constraining means includes a plurality of said receiving means disposed spaced from each other along the elongate axis of said spindle; and
(b) said pressure transmitting means interconnects a plurality of said receiving means and includes at least a pair of cables mounted under tension, one disposed on each side of said slot and extending substantially the entire length of said elongate spindle.

23. A spindle constraint assembly as in claim 22 wherein:
(a) said friction transmitting means comprises a pair of rollers, one mounted on each pressure transmitting means to span at least a portion of the distance between at least one pair of adjacent receiving means.

24. A spindle constraint assembly as in claim 2 which includes:
(a) means for mounting the rim end of said spindle to said support member so that said spindle rotates on an axis spaced from the axis of said support member and pivots about said support member;
(b) means for mounting said pressure transmitting means on said spindle rim-end mounting means;
(c) means for mounting said boom to said spindle rim-end mounting means; and
(d) said receiving means is disposed spaced from said spindle rim-end mounting means along the elongate axis of said spindle toward the hub end of said spindle.

25. A spindle constraint assembly as in claim 24 wherein:

(a) said boom assembly includes an upper and a lower arm joined at one end thereof to form an apex toward which said airfoil clew is drawn;
(b) the free end of said lower boom arm is attached to said spindle rim-end mounting means, and which includes:
(c) means for mounting the free end of the upper boom arm for pivotal movement around an axis substantially parallel to the axis of said support means.

26. A spindle constraint assembly as in claim 25 wherein:
(a) said receiving means mounting means includes a cylindrical sleeve for receipt therethrough of said elongate support member for pivotal movement of said receiving means thereabout.

27. A spindle constraint assembly as in claim 26 wherein:
(a) said booom upper arm is secured to said sleeve.

28. A spindle constraint assembly as in claim 2 wherein said boom mounting includes:
(a) means for pivoting said boom through a selected range of both angular and translational movement with respect to said spindle to vary the distance between said spindle and the point at which said airfoil clew is supported along said boom so that said distance is shortened or lengthened by substantially the amount of length said unfurled airfoil is wrapped on or unwrapped from, respectively, said spindle as the angular position of said boom is changed to change said angle of attack of said airfoil.

29. A spindle constraint assembly as in claim 28 wherein:
(a) said boom pivoting means includes a first member secured to said wheel and a second member fixed to said boom,
(b) one of said members includes means for guiding said angular and translational movements, and said other member includes means for following said guide means of said other member.

30. A spindle constraint assembly as in claim 29 wherein said guide means includes an eccentric slot and said follower means includes rollers engaging said slot.

31. A spindle constraint assembly as in claim 2 wherein said spindle is mounted with its axis substantially parallel to said support member axis.

32. A spindle constraint assembly as in claim 2 wherein said spindle is mounted with its elongate axis spaced laterally farther away from the axis of said support member at said wheel rim end than at said hub end.

33. A spindle constraint assembly as in claim 2 which includes:
(a) a plurality of receiving means spaced from each other along the elongate axis of said spindle, the spaces defined in said receiving means located farther from said hub being larger than those closer to said hub.

34. A spindle constraint assembly as in claim 1 wherein:
(a) said receiving means comprises at least a pair of sections separable from one another at said slot to enlarge the slot and permit lateral removal of the receiving means from around the spindle; and
(b) means for securing said sections together.

35. A spindle constraint assembly as in claim 34 which includes:

(a) a plurality of said friction reducing means, at least one of which is disposed in each of said sections.

36. A spindle constraint assembly as in claim 35 wherein said mounting means includes means releasably surrounding said support member.

37. A spindle constraint assembly as in claim 36 wherein:
(a) said receiving means sections are substantially planar members.

38. A spindle constraint assembly as in claim 37 wherein:
(a) each of said receiving means sections comprises a pair of planar members spaced from each other along the longitudinal elongate axis of said spindle, and said planar members are joined at at least one edge by a rigid vertical member so that each section is substantially U-shaped in cross-section; and
(b) said sections interfit to releasably surround said support member.

* * * * *